United States Patent [19]

Sorrentino

[11] 4,269,532
[45] May 26, 1981

[54] COUPLING FOR FURNITURE AND THE LIKE

[75] Inventor: Vincent P. Sorrentino, Parkland, Fla.

[73] Assignee: Bright Industries Inc., Ft. Lauderdale, Fla.

[21] Appl. No.: 56,352

[22] Filed: Jul. 10, 1979

[51] Int. Cl.³ .............................................. F16B 7/08
[52] U.S. Cl. .................................... 403/191; 403/233
[58] Field of Search .............. 403/235, 236, 233, 234, 403/237, 191, 192, 205; 256/65, 66

[56] References Cited

U.S. PATENT DOCUMENTS 2,303,309  11/1942  McArthur ............................ 403/191
4,150,907  4/1979  Thurnaaer ........................... 403/234

FOREIGN PATENT DOCUMENTS 742857  1/1956  United Kingdom ..................... 256/65

Primary Examiner—Andrew V. Kundrat

[57] ABSTRACT

A coupling for joining tubing together in the manufacture of furniture and the like comprising a pair of sleeves mounted one on the other in coplanar relation with their axes at right angle to each other and a wall mounted at the inner end of one of the sleeves with an opening in the wall for receiving a screw and the like for fastening the tubing that extends through the other sleeve.

3 Claims, 3 Drawing Figures

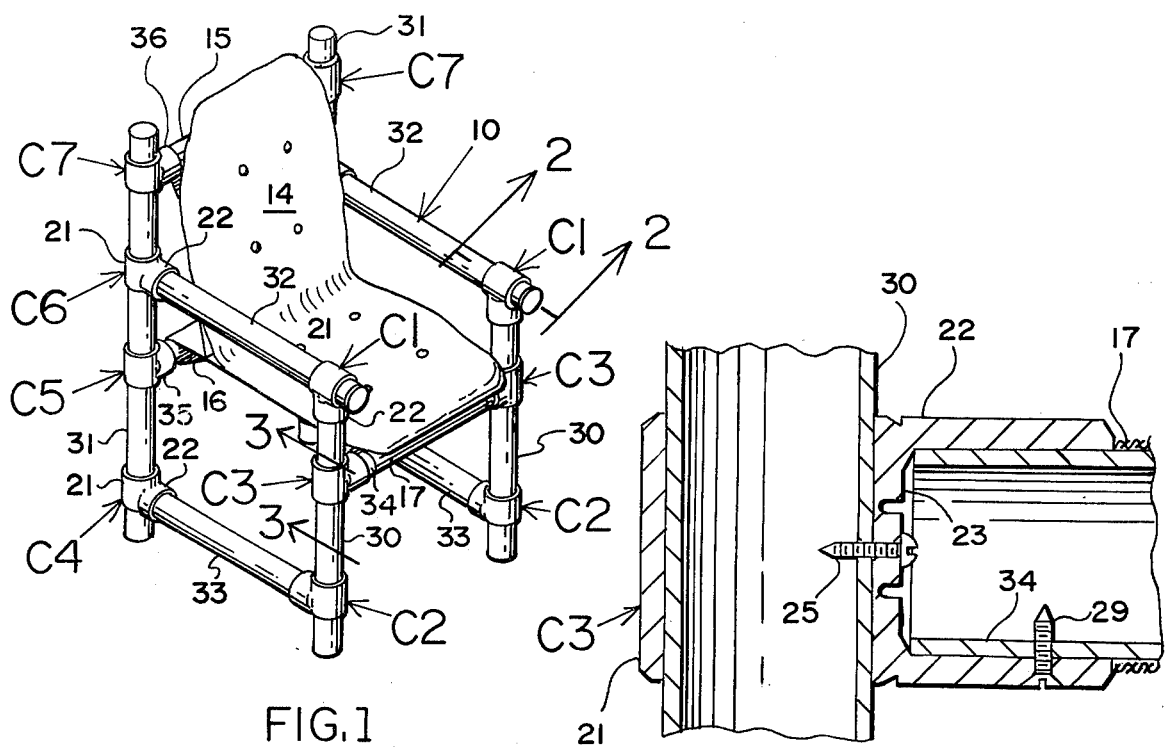
FIG.1
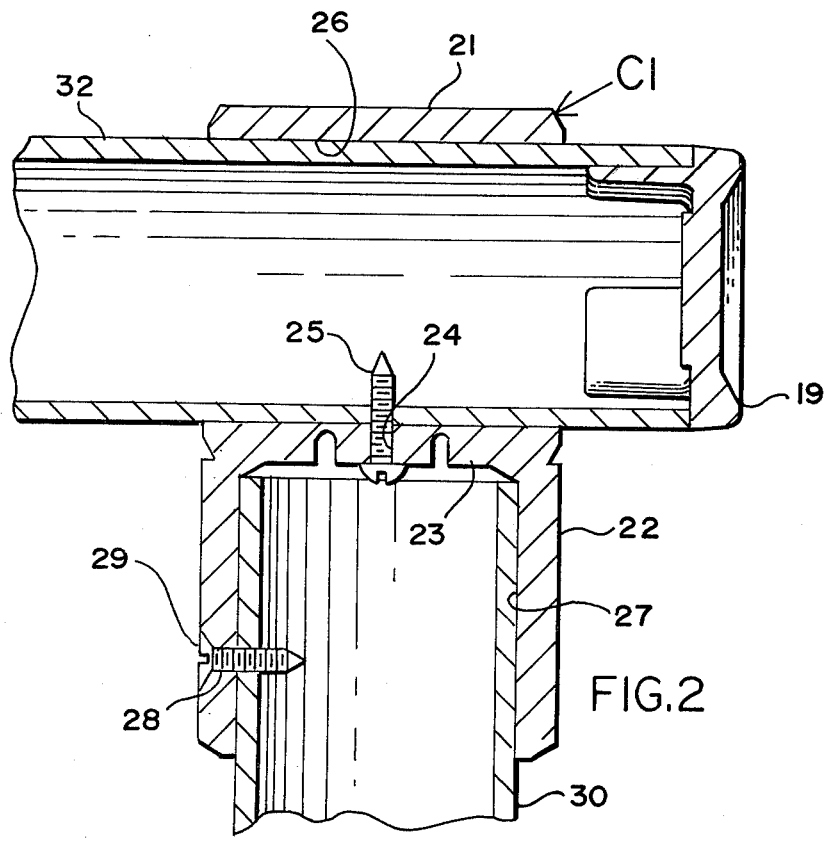
FIG.3
FIG.2

COUPLING FOR FURNITURE AND THE LIKE

BACKGROUND OF THE INVENTION

1. Field of the Invention

This invention relates to the fabrication of furniture and the like with tubing and is more particularly directed to the coupling for joining and fastening the tubing together in the manufacture of furniture.

2. Description of the Prior Art

At present the couplings utilized in the manufacture of furniture and the like with tubing, consist of two sleeves mounted together with their axes at right angles with each other, with an opening between the sleeves so that the sleeves communicate with each other. In order to secure the tubing to the coupling when the tubing are telescopically mounted in the sleeves, fasteners are applied to the outside surfaces of the coupling. These fasteners are not only viewable to the user but are also in the area in which the user touches the furniture so that the user may be injured in coming into contact with the fastener. The present invention contemplates the use of fasteners in fastening tubing to couplings wherein the fasteners are so concealed as to be out of sight of the user and out of possible contact with the user.

SUMMARY OF THE INVENTION

Therefore a principal object of the present invention is to provide a coupling for joining tubing together in the manufacture of furniture wherein fasteners used to secure the tubing to the fasteners are concealed and out of the area contacted by the user.

A further object of the present invention is to provide a coupling consisting of a pair of sleeves mounted one on the other with their axes at right angle with each other with an inner wall for receiving a concealed fastener in securing the tubing to the coupling.

With these and other objects in view, the invention will be best understood from a consideration of the following detailed description taken in connection with the accompanying drawing forming a part of this disclosure with the understanding, however, that the invention is not confined to any strict conformity with the showing of the drawing but may be changed or modified so long as such changes or modifications mark no material departure from the salient features of the invention as expressed in the appended claims.

BRIEF DESCRIPTION OF THE DRAWING

In the drawing:

FIG. 1 is a perspective view of a chair utilizing couplings that are constructed in accordance with my invention.

FIG. 2 is a cross sectional view taken along the line 2—2 of FIG. 1.

FIG. 3 is a similar view taken along the line 3—3 of FIG. 1.

DESCRIPTION OF THE PREFERRED EMBODIMENT

Referring to the drawing wherein like numerals are used to designate similar parts throughout the several views, the numeral 10 refers to a chair in the fabrication of which are a plurality of couplings of identical structure and constructed in accordance with my invention are used for joining together tubing that form the various parts of the chair 10 as is explained in detail hereinafter.

All of the couplings which are indicated by the letter -C- followed by a numeral are T-shaped consisting of a tubular sleeve portion 21 having a bore 26 and mounted on a second similar tubular sleeve portion 22 having a bore 27 with their axes at right angles to each other. Within the couplings -C- there is an end wall 23 closing off the inner end portion of the bore 21 of the tubular sleeve portion 22. The end wall 23 which forms a part of the wall of the tubular sleeve portion 21 is provided with a bore or opening 24 for receiving a screw 25 which extends through the wall of the particular tubing extending therethrough thereby securing the latter to the coupling -C-.

The tubular sleeve portion 22 of the couplings -C- are likewise provided with a bore 28 for receiving a screw 29 that extends through the side wall of the tubing received therein to fasten the coupling -C- to that particular tubing. The fastener 25 is concealed within the tubular sleeve portion 22 while the fastener 29 is on the rear side of the coupling -C- and not in the area that the user normally comes into contact in his use of the chair 10.

The chair 10 consists of a plurality of tubing secured at their ends and intermediate their ends by couplings -C1- to -C7- inclusive forming front upright support member or legs 30, combined rear legs and backrest support 31, arm rests 32, leg cross members 33, seat support cross members 34 and backrest cross member 35.

The front end portion of each of the armrests 32 extends through the bore 26 of the sleeve portion 21 of the coupling -C- while the sleeve portion 22 of the coupling -C1- is mounted on the top portion of front legs 30. The armrests are secured to the couplings -C1- by screws 25 and 29 as shown by FIG. 2 and explained hereinabove. A plug 19 is positioned over each of the open end of the armrests 32.

The rear end portion of the armrests are received by the tubular sleeve portions 22 of the coupling -C6- whose tubular sleeve portions 21 is mounted on the combined rear legs and backrest support 31. The leg cross members 33 extend between the legs 30 and 31 with their ends being received and fasten to couplings -C2- and -C4- mounted on the legs 30 and 31. Each seat support tubular member 34 and 35 extends between the legs 30,30 and 31,31 with their ends received by and fastened to couplings -C3- and -C5- respectively. Backrest support member 36 extends between rear legs 31 and have their ends received by and secured to -C7- that are mounted on the upper ends of the combined rear legs and backrest support 31.

Mounted over the backrest and seat portion of the chair 10 is a fabric body supporting member 14 provided with loops 15, 16 and 17 on its rear surface for supporting the body of the user seated thereon. The loop 15 is mounted over the backrest support tubular member 36, while the loops 16 and 17 are received over the seat support tubular members 34 and 35.

What I claim as new is:

1. A coupling for an article of furniture having interconnected vertically and horizontally disposed lengths of tubing comprising
   (a) a plurality of T shaped couplings each having
   (b) a tubular sleeve including a through bore for the reception of a length of the tubing and (c) an integral substantially right angularly disposed sleeve portion for the reception in endwise engagement of a length of said tubing, and having (d) an end wall within the right angularly disposed sleeve portion closing off the inner end thereof, (e) a screw projecting through said end wall and the tubing extending through the tubular sleeve to secure the coupling to the tubing, and (f) a screw extending through the right angularly disposed sleeve portion of the coupling to engage the tubing therein to secure to the coupling the length of tubing extending thereinto in endwise engagement, and said screw having a head countersunk within the surface of said sleeve.

2. The invention defined in claim 1 wherein the screw extending through the right angularly disposed sleeve of the coupling to engage the tubing therein is in an area in which the user does not normally come in to contact.

3. The invention defined in claim 1 wherein (a) a contoured plug having an axially extending portion projects into the open end of the tubing projecting through the through bore of the coupling to close the end of the tubing, and having (b) an outer diameter aligned with the outer surface of the tubing.

* * * * *